(12) United States Patent
Houser

(10) Patent No.: US 12,092,164 B2
(45) Date of Patent: Sep. 17, 2024

(54) METHODS AND SYSTEMS FOR AN ASYMMETRIC CLUTCH COLLAR

(71) Applicant: Dana Heavy Vehicle Systems Group, LLC, Maumee, OH (US)

(72) Inventor: Jordan M. Houser, Sylvania, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 241 days.

(21) Appl. No.: 17/655,939

(22) Filed: Mar. 22, 2022

(65) Prior Publication Data

US 2023/0304539 A1 Sep. 28, 2023

(51) Int. Cl.
*F16H 3/089* (2006.01)
*F16D 11/00* (2006.01)
*F16D 11/14* (2006.01)

(52) U.S. Cl.
CPC ............. *F16D 11/14* (2013.01); *F16H 3/089* (2013.01); *F16D 2011/008* (2013.01)

(58) Field of Classification Search
CPC ..... F16H 3/089; F16D 11/14; F16D 2011/008
USPC .......................................................... 74/339
See application file for complete search history.

(56) References Cited

U.S. PATENT DOCUMENTS

| | | | | |
|---|---|---|---|---|
| 4,244,399 A * | 1/1981 | Palau | ..................... | D03C 1/146 139/1 E |
| 7,766,779 B2 * | 8/2010 | Belmont | ................. | B60L 50/16 475/5 |
| 7,785,221 B2 * | 8/2010 | Steinwender | ............ | B60K 6/48 475/5 |
| 7,819,771 B2 | 10/2010 | Nett et al. | | |
| 8,800,401 B2 | 8/2014 | Wagner | | |
| 10,233,977 B2 | 3/2019 | Mayr | | |
| 10,302,145 B2 | 5/2019 | Hirao | | |
| 10,330,159 B2 | 6/2019 | Yu et al. | | |
| 11,060,562 B2 * | 7/2021 | Olson | ....................... | B64C 3/56 |
| 11,339,833 B2 * | 5/2022 | Engerman | ............... | B60B 35/16 |
| 2019/0242442 A1 * | 8/2019 | Shiotsu | .................... | F16H 63/30 |
| 2019/0351751 A1 * | 11/2019 | Sato | ......................... | B60K 6/48 |

FOREIGN PATENT DOCUMENTS

JP 5634847 B2 12/2014

* cited by examiner

*Primary Examiner* — Ha Dinh Ho
(74) *Attorney, Agent, or Firm* — McCoy Russell LLP

(57) ABSTRACT

Various methods and systems are provided for an dual-faced clutch collar for a transmission. In one example, a dual-faced clutch collar positioned on an output shaft of a gearbox comprises a clutch collar spline, where the clutch collar spline mates with the output shaft; a first face having a first set of axially protruding teeth to engage a high torque coupling, the first set of teeth having a first profile; and a second face having a second set of axially protruding teeth to engage a low torque coupling; the second set of teeth having a second profile; the second profile being different from the first profile. The first profile may be a courser tooth profile, to allow for maximum load carrying capacity, and the second profile may be a finer tooth profile, to allow for quicker gear engagements and more neutral space (e.g., due to reduced tooth depths).

14 Claims, 4 Drawing Sheets

METHODS AND SYSTEMS FOR AN ASYMMETRIC CLUTCH COLLAR

TECHNICAL FIELD

Embodiments of the subject matter disclosed herein relate generally to dog clutch transmission systems.

BACKGROUND

A multistage transmission of a vehicle may include one or more dog clutches used for shifting between gears of the transmission. A dog clutch may include a clutch collar with a set of teeth that axially protrude from a face of the clutch collar. During shifting from a first gear of the transmission to a second gear of the transmission, the dog clutch may be controlled to slide along a shaft of the transmission, first disengaging with the first gear, and subsequently engaging with the second gear. The dog clutch engages with the second gear when the set of teeth of the clutch collar mesh with a set of similarly-sized teeth of the second gear.

The clutch collar may be a dual-faced clutch collar, where a first set of teeth protrude axially from a first face of the dual-faced clutch collar, and a second, symmetrical set of teeth protrude axially from a second, opposing face of the dual-faced clutch collar. The dual-faced clutch collar may be controlled to slide in a first direction along the shaft to engage teeth of the first gear with teeth of the first face, or controlled to slide in a second, opposing direction along the shaft to engage teeth of the second gear with teeth of the second face.

However, the inventors herein have recognized potential issues with symmetrical dual-faced clutch collars. If the dual-faced clutch collar is arranged on an output shaft of the transmission, the dual-faced clutch collar may engage two different power flows, where the two different power flows may have different operational requirements. For example, the dual-faced clutch collar may support a first, smaller amount of torque on a first side (e.g., with the teeth of the first face) and a second, larger amount of torque on a second side (e.g., with the teeth of the second face). As a result, a geometry of the dual-faced clutch collar may be sized in accordance a maximum load condition (e.g., the second amount of torque). Sizing the dual-faced clutch collar based on the maximum load condition may increase an amount of material used in the dual-faced clutch collar, increasing its cost. A low-torque side (e.g., the first side) that is sized based on a high-torque side (e.g., the second side) may have a tooth depth that is greater than a tooth depth that is sufficient for supporting the first amount of torque, reducing an amount of neutral space between the first face of the dual-faced clutch collar and the first gear. Additionally, an engagement of the dual-faced clutch collar on the low-torque side may be slower than an engagement on the high-torque side, negatively affecting a performance of the transmission.

SUMMARY

In one example, the issues described above may be addressed by a dual-faced clutch collar positioned on an output shaft of a gearbox, the dual-faced clutch collar comprising a clutch collar spline, where the clutch collar spline mates with the output shaft; a first face having a first set of axially protruding teeth to engage a high torque coupling, the first set of teeth having a first profile; and a second face having a second set of axially protruding teeth to engage a low torque coupling; the second set of teeth having a second profile; the second profile being different from the first profile. The first profile may be a courser tooth profile, where the first profile may allow for maximum load carrying capacity, and the second profile may be a finer tooth profile, where the second profile may allow for quicker gear engagements and more neutral space (e.g., due to reduced tooth depths). By including different tooth profiles on different faces of an asymmetric dual-faced clutch collar, an efficiency of the dual-faced clutch collar may be increased, and an amount of material used in the dual-faced clutch collar may be reduced, reducing a cost of the dual-faced clutch collar.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following disclosure relates to methods and systems for a clutch of a vehicle transmission. A vehicle, such as the vehicle shown by FIG. 1A, includes a transmission with an asymmetric clutch having a dual-faced clutch collar, such as the dual-faced clutch collar shown in FIGS. 2A and 2B. A first face of the dual-faced clutch collar may engage a first gear of the transmission, and a second, opposing face of the dual-faced clutch collar may engage a second gear of the transmission, as depicted in a simplified gearbox shown in FIG. 1B. FIG. 2A shows a first view of the dual-faced clutch collar from a first side, and FIG. 2B shows a second view of the dual-faced clutch collar from a second side. The asymmetric clutch and dual-faced clutch collar may engage one or more gears of the transmission via a method illustrated in the flowchart of FIG. 3.

Figure 1A:
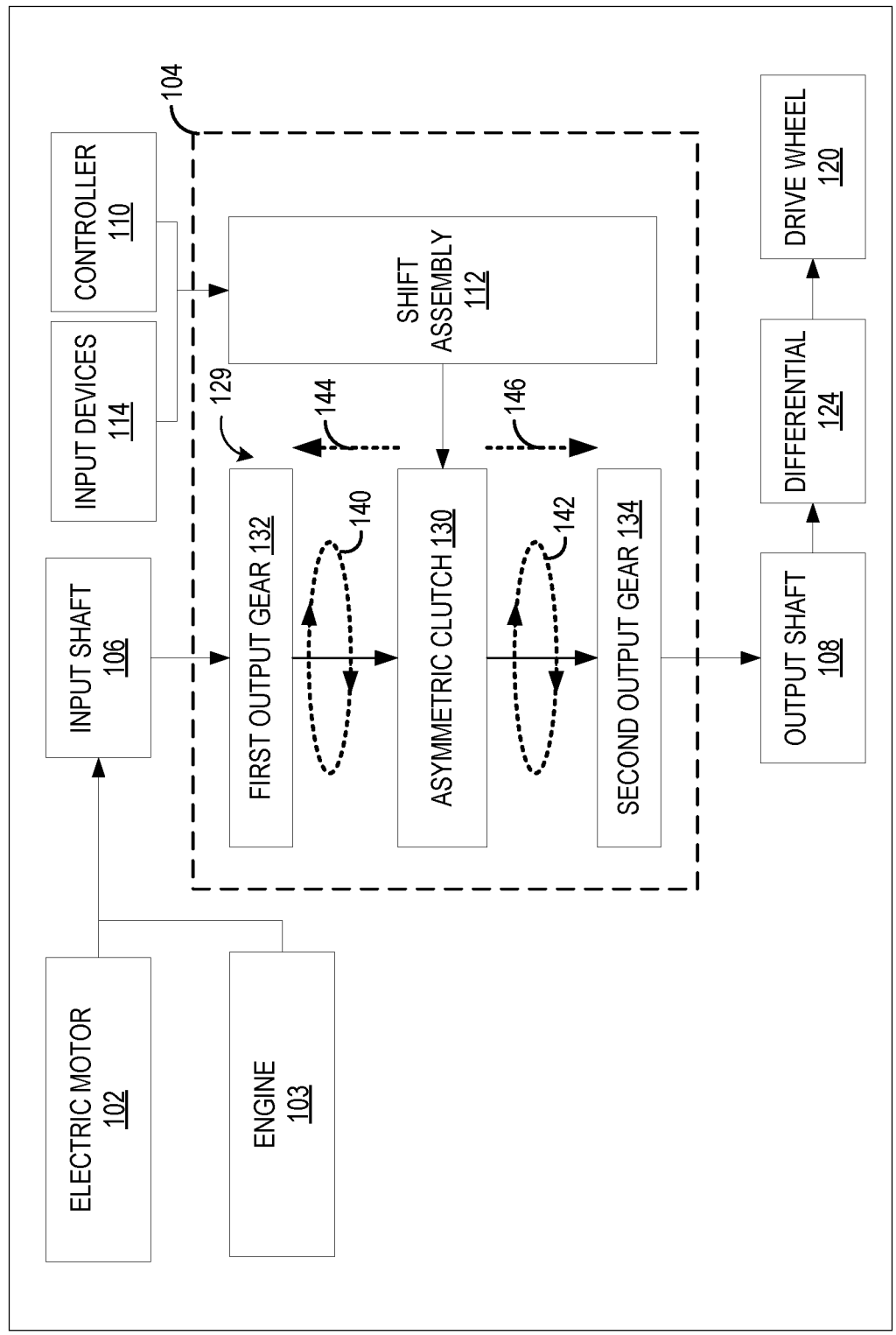
FIG. 1A schematically shows a vehicle including a transmission with an asymmetric clutch with a dual-faced clutch collar, in accordance with one or more embodiments of the present disclosure.
Figure 2A:
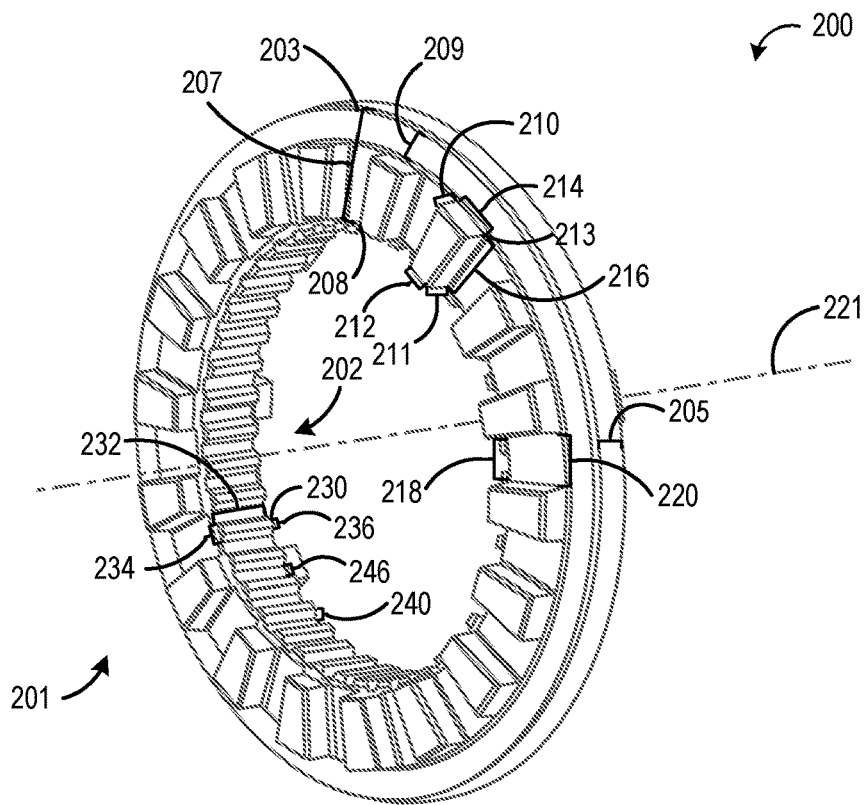
FIG. 2A shows a first view of an asymmetric, dual-faced clutch collar from a first side, in accordance with one or more embodiments of the present disclosure.
Figure 2B:
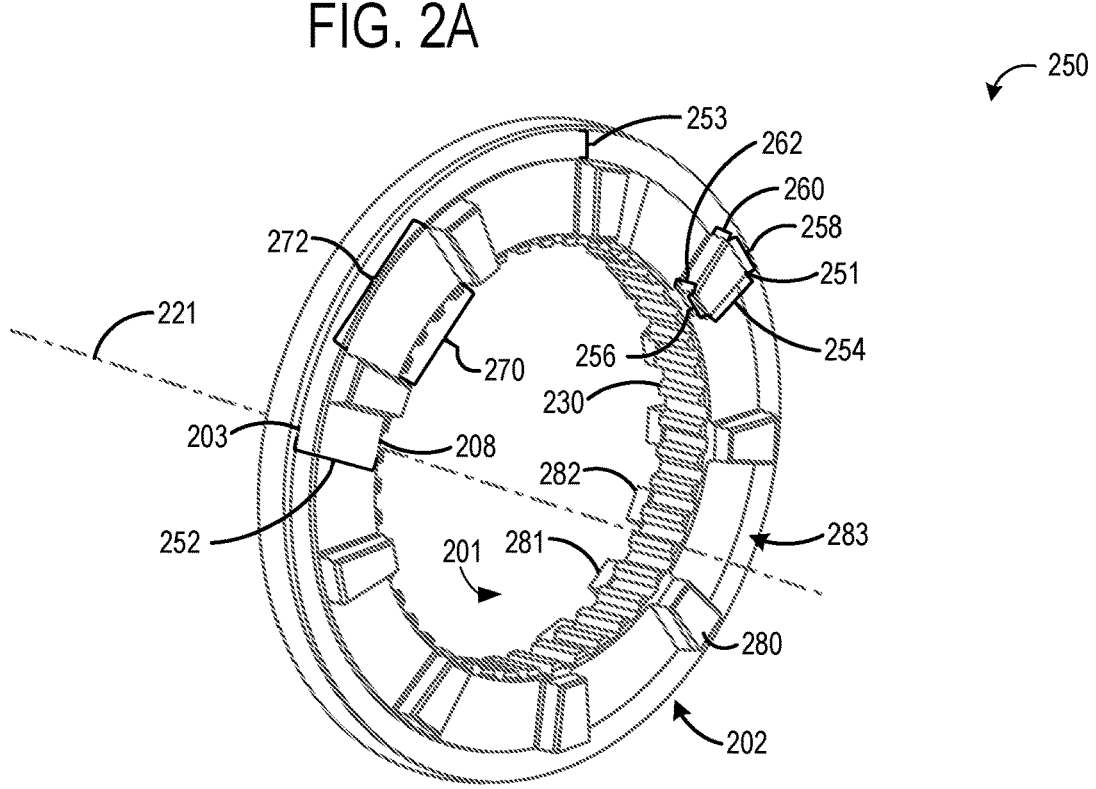
FIG. 2B shows a second view of an asymmetric dual-faced clutch collar from a second side, in accordance with one or more embodiments of the present disclosure.

Referring now to FIG. 1A, an example vehicle 100 is shown. In some examples, vehicle 100 may be a hybrid vehicle configured to provide torque to one or more wheels from multiple sources, such as engine 103 and electric motor 102. In other examples, vehicle 100 is configured to provide torque to the one or more wheels via only one of engine 103 or electric motor 102. In the example in which vehicle 100 is a hybrid vehicle, operation of the vehicle 100 may be adjusted between various different modes in which torque is supplied to the one or more wheels via only the engine 103, via only the electric motor 102, or via a combination of the engine 103 and electric motor 102. Electric motor 102 may be a motor/generator configured to provide torque output to the one or more wheels and to generate electrical energy during operation of the vehicle 100 (e.g., via regenerative braking, as one example). Vehicle 100 is provided as an example of a system including a shift assembly as described herein. However, vehicle 100 is not intended to be limiting and in some examples the shift assembly may be included in vehicles having a different configuration (e.g., a different number and/or relative configuration of wheels and/or other components).

Vehicle 100 may be powered by electric motor 102 and/or engine 103, which generates torque at a drive wheel 120 when one or more clutches are engaged via a transmission 104 coupled to a transmission input shaft 106 and an output shaft 108. In some embodiments, the output shaft 108 is a countershaft rotatably coupled to an input of a differential gear assembly 124, which may power one or more of drive wheel 120. In other embodiments, the output shaft 108 may be coaxially aligned with the transmission input shaft 106, and a countershaft may be used to transfer torque applied to the input shaft 106 to the output shaft 108 via a gear assembly of the transmission. In still other embodiments, engine 103 and/or electric motor 102, transmission 104, input shaft 106, and output shaft 108 may be aligned perpendicular to axles of vehicle 100, whereby the transfer of torque from output shaft 108 to drive wheel 120 is accomplished via the differential gear assembly 124.

Transmission 104 may be a manual transmission, which gear selection is performed by an operator of vehicle 100 via one or more input devices 114 (e.g., a shift lever, an accelerator), or transmission 104 may be an automatic transmission, whereby shifting is handled automatically by an electronic controller 110, and gear selection is automatically determined by the controller based on vehicle operating conditions (e.g., engine speed, vehicle speed, wheel torque, etc.).

For automatic shifting, electronic controller 110 may be communicatively coupled to a shift assembly 112 that engages gears of transmission 104, where electronic controller 110 may command shift assembly 112 to engage and/or disengage gears of the transmission. Shift assembly 112 may include actuator sensors from which electronic controller 110 may receive data used to control operation of shift assembly 112 (e.g., to adjust a selected gear of transmission 104). Electronic controller 110 may also receive input from other sensors of vehicle 100, such as wheel sensors, pedal position sensors, temperature sensors, pressure sensors, speed sensors, throttle sensors, battery charge sensors, air-fuel ratio sensors, and the like. Electronic controller 110 may send control signals to various actuators communicatively coupled to electric motor 102, engine 103, and/or other components of vehicle 100. The various actuators may include motors of shift assembly 112 that engage the gears of transmission 104 by sliding synchronizer rings and clutches along transmission input shaft 106 and/or transmission output shaft 108. For example, the synchronizer rings and clutches may be moved along the transmission input shaft 106 and/or transmission output shaft 108 by shift forks coupled to a shift lever. The various actuators may also include, for example, various valves, throttles, fuel injectors, etc. The types of sensors and actuators listed herein are for illustrative purposes and any type of sensors and/or actuators may be included without departing from the scope of this disclosure.

Electronic controller 110 may be a microcomputer, which may include a microprocessor unit, input/output ports, and an electronic storage medium for executable programs and calibration values. Electronic controller 110 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. Electronic controller 110 may be electrically coupled to other components of vehicle 100, such as, for example, a battery and a starter, which may be used to provide initial power to the controller and/or start the engine. Vehicle 100 may be controlled at least partially by the controller 110 and by input from a vehicle operator via the one or more input devices 114 (e.g., a shift lever, an accelerator pedal with a pedal position sensor for generating a proportional pedal position signal).

As gears of transmission 104 are shifted, a torque applied to transmission input shaft 106 is transferred to transmission output shaft 108, which is rotatably coupled to differential gear assembly 124, which in turn rotates drive wheel 120. Transmission 104 may include various gears rotatably coupled to transmission input shaft 106 and/or transmission output shaft 108. For example, transmission 104 may include a first gear, a second gear, a third gear, and a reverse gear. In some embodiments, a fourth, fifth, and/or additional gears may also be included in transmission 104. In FIG. 1A, a simplified gear assembly 129 is depicted including a first output gear 132, a second output gear 134, and an asymmetric clutch 130 arranged coaxially around transmission output shaft 108, where asymmetric clutch 130 is positioned between first output gear 132 and second output gear 134. For the purposes of this disclosure, an asymmetric clutch refers to a clutch with a dual-faced clutch collar, where a first face of the dual-faced clutch collar includes a different tooth profile than a second face of the dual-faced clutch collar. In the simplified gear assembly, first output gear 132 and second output gear 134 may represent two consecutive gears of the various gears. For example, first output gear 132 may represent the first gear of the transmission, and second output gear 134 may represent the second gear of the transmission, or first output gear 132 may represent the second gear of the transmission, and second output gear 134 may represent the third gear of the transmission, and so on.

Asymmetric clutch 130 may be controlled (e.g., by controller 110 and/or input devices 114) to slide in a first direction 144 to engage with first output gear 132, or slide in a second direction 142 to engage with second output gear 134. Asymmetric clutch 130 may disengage with first output gear 132 and engage with second output gear 134 to shift up when accelerating vehicle 100, and asymmetric clutch 130 may disengage with second output gear 134 and engage with first output gear 132 to shift down when slowing vehicle 100 down.

During operation of vehicle 100 powered by electric motor 102, a first torque may be generated on transmission input shaft 106 by electric motor 102. As transmission input shaft 106 rotates, the first torque may be transferred from transmission input shaft 106 to first output gear 132 and second output gear 134, in accordance with respective gear ratios of input gears of transmission input shaft 106 coupled to first output gear 132 and second output gear 134. As a result of having different gear ratios, first output gear 132 may rotate in direction 140 at a first rotational speed, and second output gear 134 may rotate in direction 140 at a second, different rotational speed.

Asymmetric clutch 130 may be coupled to transmission output shaft 108, where a rotational speed of asymmetric clutch 130 may be the same as a rotational speed of transmission output shaft 108. When the rotational speed of transmission output shaft 108 and asymmetric clutch 130 are equal to the first rotational speed of first output gear 132, asymmetric clutch 130 may engage with first output gear 132. When the rotational speed of transmission output shaft 108 and asymmetric clutch 130 are equal to the second rotational speed of second output gear 134, asymmetric clutch 130 may engage with second output gear 134.

For example, when vehicle 100 starts operation, the rotational speed of transmission output shaft 108 and asymmetric clutch 130 may both be zero (e.g., vehicle 100 is not in motion), and the rotational speed of transmission input shaft 106 may be zero (e.g., electric motor 102 may be switched off, or transmission input shaft 106 may be disengaged from electric motor 102 via a clutch on transmission input shaft 106). As a result of the rotational speed of asymmetric clutch 130 and the rotational speed of transmission input shaft 106 being zero, asymmetric clutch 130 may engage with first output gear 132. In response to a command from input devices 114 and/or electronic controller 110, shift assembly 112 may slide asymmetric clutch 130 in direction 144 to engage first output gear 132. As asymmetric clutch 130 engages first output gear 132, teeth of a first face of an dual-faced clutch collar of asymmetric clutch 130 may mesh with teeth of first output gear 132, mechanically coupling asymmetric clutch 130 to first output gear 132. When asymmetric clutch 130 is coupled to first output gear 132, the first torque may be transferred from transmission input shaft 106 to asymmetric clutch 130 via first output gear 132, generating a second torque on transmission output shaft 108, where the second torque is based on a gear ratio of first output gear 132.

As vehicle 100 accelerates, vehicle 100 may achieve a threshold speed, where at the threshold speed, asymmetric clutch 130 may engage with second output gear 134. In response to a command from input devices 114 and/or electronic controller 110, shift assembly 112 may slide asymmetric clutch 130 in direction 146 to engage second output gear 134. As asymmetric clutch 130 engages second output gear 134, teeth of a second, opposing face of the dual-faced clutch collar of asymmetric clutch 130 may mesh with similarly-sized teeth of second output gear 134, mechanically coupling asymmetric clutch 130 to second output gear 134. When asymmetric clutch 130 is coupled to second output gear 134, the first torque may be transferred from transmission input shaft 106 to asymmetric clutch 130 via second output gear 134, generating a third torque on transmission output shaft 108, where the third torque is based on a gear ratio of second output gear 134. An engagement of first output gear 132 and second output gear 134 by asymmetric clutch 130 in described in greater detail below in reference to FIG. 1B.

Figure 1B:
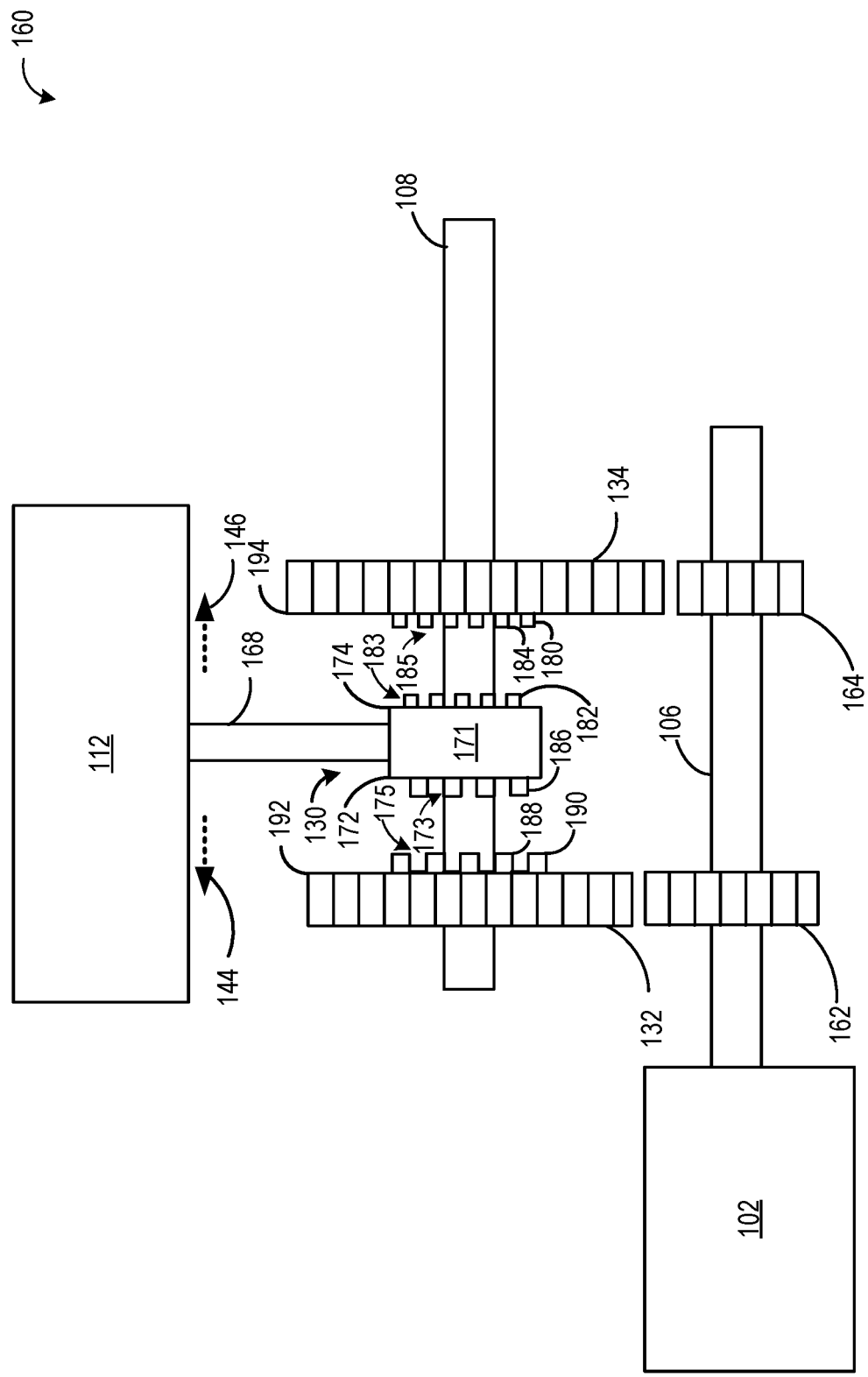
FIG. 1B schematically shows a simplified gearbox of a transmission including an an asymmetric clutch with a dual-faced clutch collar and two gears, in accordance with one or more embodiments of the present disclosure.

Referring now to FIG. 1B, a simplified gearbox 160 depicts simplified gear assembly 129 of FIG. 1A in greater detail. In FIG. 1B, a first input gear 162 and a second input gear 164 may be mechanically coupled to transmission input shaft 106, where first and second input gears 162 and 164 rotate at a same rotational speed as transmission input shaft 106. First input gear 162 may be mechanically coupled to first output gear 132 described above in reference to FIG. 1A. Second input gear 164 may be mechanically coupled to second output gear 134 described above in reference to FIG. 1A. As electric motor 102 applies the first torque to transmission input shaft 106, a rotation of first input gear 162 causes first output gear 132 to rotate at the first rotational speed described above, in an opposite direction of the rotation of first input gear 162, and a rotation of second input gear 164 causes second output gear 134 to rotate at the second rotational speed described above, in an opposite direction of the rotation of the second input gear 164.

The first rotational speed may depend on a gear ratio between first input gear 162 and first output gear 132, and the second rotational speed may depend on a gear ratio between second input gear 164 and second output gear 134. As an example, in one embodiment, first input gear 162 may be rotatably coupled to first output gear 132 at a gear ratio of 3.666, and second input gear 164 may be rotatably coupled to second output gear 134 at a gear ratio of 2.047 (e.g., where first output gear 132 and second output gear 134 correspond to first and second gears of vehicle 100, respectively). Thus, when the vehicle is in first gear, first input gear 162 engages with first output gear 132 such that transmission input shaft 106 completes 3.666 rotations in order for transmission output shaft 108 to complete a single rotation. When the vehicle is in second gear, second input gear 164 engages with second output gear 134 such that transmission input shaft 106 completes 2.047 rotations in order for transmission output shaft 108 to complete a single rotation.

In another embodiment, first input gear 162 may be rotatably coupled to first output gear 132 at the gear ratio of 2.047, and second input shaft 164 may be rotatably coupled to second output gear 134 at a gear ratio of 1.258 (e.g., where first output gear 132 and second output gear 134 correspond to second and third gears of vehicle 100, respectively). When the vehicle is in third gear, second input gear 164 engages with second output gear 134 such that transmission input shaft 106 completes 1.258 rotations in order for transmission output shaft 108 to complete a single rotation. In other embodiments, different gear ratios may be used. It should be appreciated that the examples provided herein are for illustrative purposes, and various gear ratios may be used without departing from the scope of this disclosure.

In FIG. 1B, first output gear 132 and second output gear 134 are engaged by shift assembly 112 via a shift fork 168. In various embodiments, shift assembly 112 may control a movement and/or a position of shift fork 168 via one or more actuators. The one or more actuators may be of various different types, and may include corresponding actuator motors activated by a controller (e.g., electronic controller 110). The one or more actuators may adjust the position of shift fork 168 to control a position of asymmetric clutch 130 along transmission output shaft 108. In various embodiments, the actuator motors may use reduction gearings and/or reduction gearing assemblies to control the movement of shift fork 168.

A dual-faced clutch collar 171 of asymmetric clutch 130 may rotate at a rotational speed of output shaft 108, as a result of a coupling of dual-faced clutch collar 171 with output shaft 108. In various embodiments, dual-faced clutch collar 171 may be coupled to output shaft 108 via a plurality of splines configured along an inner perimeter of dual-faced clutch collar 171, which may engage with splines of output shaft 108, as described in greater detail below in reference to FIGS. 2A and 2B. In accordance with the movement of shift fork 168, dual-faced clutch collar 171 may be moved along output shaft 108 in the first direction 144 to engage first output gear 132 (e.g., horizontally to the left), or dual-faced clutch collar 171 may be moved along output shaft 108 in the second direction 146 to engage second output gear 134 (e.g., horizontally to the right).

For example, in the embodiment depicted in FIG. 1B, to engage first output gear 132, shift assembly 112 may move shift fork 168 in direction 144 (e.g., to the left), whereby asymmetric clutch 130 may slide dual-faced clutch collar 171 from a neutral position (e.g., a position in which no gears are engaged) in direction 144 to engage first output gear 132. To disengage first output gear 132 and engage second output gear 134, shift assembly 112 may move shift fork 168 in direction 146 (e.g., to the right), whereby asymmetric clutch 130 may slide dual-faced clutch collar 171 into the neutral position to the right to disengage first output gear 132. Shift assembly 112 may continue to slide shift fork 168 to the right, whereby asymmetric clutch 130 may slide dual-faced clutch collar 171 to engage second output gear 134.

The engagement and disengagement of gears of transmission 104 by shift assembly 112 may be controlled by a controller of the vehicle, such as electronic controller 110, in response to signals received from various sensors of the vehicle. For example, as vehicle 100 speeds up, the controller may receive indications of vehicle speed from sensors including pedal position sensors, throttle sensors, wheel sensors, and the like. Additionally, the controller may receive from shift assembly 112 an indication that first output gear 132 is engaged. When the speed of the vehicle exceeds a threshold speed, the controller may signal to shift assembly 112 to engage one or more actuator gear assemblies in order to disengage first output gear 132 and engage second output gear 134. As shift fork 168 engages second output gear 134, a position sensor of shift assembly 112 may indicate to the controller that vehicle 100 is in the relevant gear.

Similarly, as vehicle 100 slows down, when the controller receives signals from the sensors that the speed of the vehicle has decreased below a threshold value for engaging first output gear 132, the controller may signal to shift assembly 112 to move shift fork 168 into a position corresponding to neutral. The controller may signal to shift assembly 112 to engage the one or more actuator gear assemblies in order to disengage second output gear 134 and engage first output gear 132. As shift fork 168 engages first output gear 132, a position sensor of shift assembly 112 may indicate to the controller that vehicle 100 is in the relevant gear.

Dual-faced clutch collar 171 may engage first output gear 132 via a first set of teeth 173 protruding axially from a first face 172 of dual-faced clutch collar 171, where the first set of teeth 173 engage first output gear 132 by sliding to mesh with a second set of teeth 175 protruding axially from an opposing face 192 of first output gear 132, where the second set of teeth 175 are similarly sized to the first set of teeth 173. Thus, when dual-faced clutch collar 171 engages first output gear 132, each tooth of the first set of teeth 173 slides in between two opposing teeth of the second set of teeth 175. For example, in FIG. 1B, a tooth 186 of the first set of teeth 173 may slide into a space (e.g., a dog hole) between a first adjacent tooth 188 and a second adjacent tooth 190 of the second set of teeth 175. Accordingly, each tooth of the second set of teeth 175 slides in between two opposing teeth of the first set of teeth 173.

In some embodiments, a first spacing of the second set of teeth 175 may not be the same as a second spacing of the first set of teeth 173, where the teeth of the second set of teeth 175 may not engage all sides of the teeth of the first set of teeth 173. In other words, each tooth of the second set of teeth 175 may slide into a space between two corresponding teeth of the first set of teeth 173, where the space has a width that is greater than a width of the teeth of the second set of teeth 175. Therefore, each tooth of the second set of teeth 175 may engage a similarly-sized tooth of the first set of teeth 173 on one side of the space, and may not engage a similarly-sized tooth of the first set of teeth 173 on an opposing side of the space. For example, a spacing between teeth 188 and 190 may be greater than a width of tooth 186, whereby when the first set of teeth 173 engages with the second set of teeth 175, tooth 186 may engage a side of tooth 188 and may not engage a side of tooth 190, or tooth 186 may engage a side of tooth 190 and may not engage a side of tooth 188. The spacing of the teeth of dual-faced clutch collar 171 is described in greater detail below in reference to FIGS. 2A and 2B.

Similarly, dual-faced clutch collar 171 may engage second output gear 134 via a first set of teeth 183 protruding axially from a second face 174 of dual-faced clutch collar 171, where the first set of teeth 183 engage second output gear 134 by sliding to mesh with a second set of teeth 185 protruding axially from an opposing face 194 of second output gear 134, where the second set of teeth 185 are similarly sized to the first set of teeth 183. Thus, when dual-faced clutch collar 171 engages second output gear 134, each tooth of the first set of teeth 183 may slide between two adjacent teeth of the second set of teeth 185. For example, a tooth 182 of the first set of teeth 183 may slide into a space (e.g., a dog hole) between a first adjacent tooth 180 and a second adjacent tooth 184 of the second set of teeth 185. Similarly, each tooth of the second set of teeth 185 may be moved in between two adjacent teeth of the first set of teeth 183. As described above, in some embodiments, the space between first adjacent tooth 180 and second adjacent tooth 184 may be greater than a width of tooth 182, whereby tooth 182 may engage with a side of first adjacent tooth 180 and may not engage with a side of second adjacent tooth 184, or tooth 182 may engage with a side of second adjacent tooth 184 and may not engage with a side of first adjacent tooth 180.

The first set of teeth 173 of first face 172 of dual-faced clutch collar 171 is similarly sized to the second set of teeth 175 of opposing face 192 of first output gear 132. Similarly, the first set of teeth 183 of second face 174 of dual-faced clutch collar 171 is similarly sized to the second set of teeth 185 of opposing face 194 of second output gear 134. However, the first set of teeth 173 of first face 172 may not be similarly sized to the first set of teeth 183 of second face 174. For example, tooth 186 of first face 172 of dual-faced clutch collar 171 may have a first profile, and tooth 182 of second face 174 of dual-faced clutch collar 171 may have a second profile, where the first profile is not the same as the second profile (e.g., where dual-faced clutch collar 171 is asymmetric with respect to first face 172 and second face 174). In FIG. 1B, the first set of teeth 183 of second face 174 are depicted as having a smaller size than the first set of teeth 173 of first face 172. In other embodiments, the first set of teeth 183 of second face 174 may have a larger size than the first set of teeth 173 of first face 172. Additionally or alternatively, the first profile may include a greater number of teeth than the second profile, or the second profile may include a greater number of teeth than the first profile. Additionally, the first set of teeth 183 of second face 174 are depicted as being spaced closer together than the first set of teeth 173 of first face 172. In other embodiments, the first set of teeth 183 of second face 174 may not be spaced closer together than the first set of teeth 173 of first face 172. The sizing and spacing of the first set of teeth 173 and the first set of teeth 183 and a corresponding asymmetry of dual-faced clutch collar 171 is described in greater detail below in reference to FIGS. 2A and 2B.

A relative sizing and/or number of the first set of teeth 173 of first face 172 and the first set of teeth 183 of second face 174 may depend on a difference between an amount of torque supported by the first set of teeth 173 of first face 172 when dual-faced clutch collar 171 engages with first output gear 132 (e.g., the second torque described above in reference to FIG. 1A) and an amount of torque supported by the first set of teeth 183 of second face 174 when dual-faced clutch collar 171 engages with second output gear 134 (e.g., the third torque described above in reference to FIG. 1A).

When the first set of teeth 173 mesh with the second set of teeth 175, dual-faced clutch collar 171 may be mechanically coupled to first output gear 132. As a result of dual-faced clutch collar 171 being mechanically coupled to first output gear 132, the first torque applied to transition input shaft 106 by electric motor 102 may generate the second torque applied to transition output shaft 108, where the second torque is a function of the first torque and a first gear ratio between first output gear 132 and first input gear 162. Similarly, when the first set of teeth 183 mesh with the second set of teeth 185, dual-faced clutch collar 171 may be mechanically coupled to second output gear 134. As a result of dual-faced clutch collar 171 being mechanically coupled to second output gear 134, the first torque applied to transition input shaft 106 by electric motor 102 may generate the third torque applied to transition output shaft 108, where the third torque is a function of the first torque and a second gear ratio between second output gear 134 and second input gear 164.

Due to the difference between the first gear ratio and the second gear ratio, the second torque applied to transition output shaft 108 by the first output gear 132 and the third torque applied to transition output shaft 108 by the second output gear 134 may not be the same. As a result of the second torque and the third torque not being the same, the first set of teeth 173 may be of a different number, size, of a different shape, and/or spaced at a different distance than the first set of teeth 183. For example, if the second torque is larger than the third torque, the first set of teeth 183 of second face 174 may be smaller than the first set of teeth 173 of first face 172. Additionally or alternatively, the first set of teeth 183 of second face 174 may include less teeth than the first set of teeth 173 of first face 172, and a spacing of the less teeth of the first set of teeth 183 may be greater than a spacing of the first set of teeth 173 of first face 172. By reducing a size or number of the first set of teeth 183 of second face 174 with respect to the first set of teeth 173 of first face 172, a time taken for the first set of teeth 173 to mesh with the second set of teeth 175 may be decreased, resulting in a faster engagement of the first output gear 132 and an increased performance of the vehicle.

FIGS. 2A and 2B show perspective views of a dual-faced clutch collar such as the dual-faced clutch collar 171 described above. FIGS. 2A and 2B are shown approximately to scale.

Referring now to FIG. 2A, a first perspective view of an asymmetric, dual-faced clutch collar 200 of a clutch (e.g., asymmetric clutch 130) of a transmission (e.g., transmission 104) is shown, where dual-faced clutch collar 200 may be a non-limiting embodiment of dual-faced clutch collar 171 of FIG. 1B.

Dual-faced clutch collar 200 is an annular member coaxially aligned around a central axis 221, configured to slidably couple with a shaft of a transmission (e.g., transmission 104 of FIG. 1A), such as an output shaft (e.g., transmission output shaft 108), aligned along the central axis. As such, dual-faced clutch collar 200 may slide along the shaft, for example, from a first position engaging a first gear of the transmission, to a second position engaging a second gear of the transmission. The first gear and the second gear may be configured to rotate freely around the shaft at the first position and the second position, respectively, under conditions when dual-faced clutch collar 200 is not engaged with the first gear or the second gear, respectively. Dual-faced clutch collar 200 has two faces, including a first face 201 on a first axial side of dual-faced clutch collar 200 (shown in FIG. 2A), and a second face 202 on a second, opposing axial side of dual-faced clutch collar 200 (shown in FIG. 2B). Thus, at the first position engaging the first gear, first face 201 may engage with an opposing face of the first gear, and at the second position engaging the second gear, second face 202 may engage with an opposing face of the second gear. The first gear and the second gear may be non-limiting embodiments of first output gear 132 and second output gear 134, respectively. In various embodiments, dual-faced clutch collar 200 may be constructed out of a hard material such as steel, aluminum, magnesium, carbon fiber, and/or other alloys of carbon.

Dual-faced clutch collar 200 may have an axial width 205, as measured between first face 201 and second face 202 on an outer perimeter 203. First face 201 of dual-faced clutch collar 200 may extend radially out from an inner perimeter 208 of dual-faced clutch collar 200 to outer perimeter 203 of dual-faced clutch collar 200 for a radial extent 207.

Dual-faced clutch collar 200 may include a plurality of splines 230 distributed around inner perimeter 208 of dual-faced clutch collar 200, each spline 230 extending axially across dual-faced clutch collar 200 from first face 201 to second face 202. The plurality of splines 230 may mesh with similarly sized respective plurality of splines arranged on the shaft, facilitating a slidable coupling of dual-faced clutch collar 200 with the shaft. In various embodiments, each spline 230 may have an axial length 232 extending from first face 201 to second face 202, and a height 240 extending radially towards central axis 221 (e.g., extending towards the shaft). Each spline 230 may have a quadrangular, three-dimensional shape, where the spline 230 may have a base width 234 extending circumferentially along inner perimeter 208, and a top width 236 proximate the shaft, where the top width 236 may be less than the base width 234. In other words, each spline may have angled side walls extending from the base to a top surface. The plurality of splines 230 may be spaced equidistant from each other, such that each spline 230 is separated from a first adjacent spline 230 in a first circumferential direction by a spacing 246, and the spline 230 is separated from a second adjacent spline 230 in a second, opposite circumferential direction by the spacing 246.

When dual-faced clutch collar 200 engages with the first gear via first face 201, a first torque of the first gear may be transferred to dual-faced clutch collar 200, whereby dual-faced clutch collar 200 may rotate at a first rotational speed, in sync with a rotation of the first gear. As dual-faced clutch collar 200 rotates, the first torque may be transferred to the shaft via the coupling of the plurality of splines 230 with the similarly sized respective plurality of splines arranged on the shaft, thereby rotating the shaft at the first rotational speed. When dual-faced clutch collar 200 engages with the second gear via second face 202, a second torque of the second gear may be transferred to dual-faced clutch collar 200, whereby dual-faced clutch collar 200 may rotate at a second rotational speed, in sync with a rotation of the second gear. As dual-faced clutch collar 200 rotates, the second torque may be transferred to the shaft via the coupling of the plurality of splines 230 with the similarly sized respective plurality of splines arranged on the shaft, thereby rotating the shaft at the second rotational speed.

First face 201 of dual-faced clutch collar 200 may include a set of teeth 213, where each tooth 213 protrudes axially out of first face 201. In various embodiments, each tooth 213 may have a three-dimensional quadrangular shape, with a length 216 extending radially out from inner perimeter 208, an inner width 212 at inner perimeter 208, and an outer width 214 proximate to outer perimeter 203. In some embodiments, as depicted in FIG. 2A, some or all of teeth 213 may have a length 216 that is less than the radial extent 207 of first face 201, where the teeth 213 do not extend all the way to outer perimeter 203, and the teeth 213 are inset from outer perimeter 203 by an inset depth 209. Each tooth 213 may also have a height 210 at which the tooth 213 extends axially out from first face 201. Further, in some embodiments, the teeth 213 may include a beveled outward-facing surface, where the outward-facing surface has an outer height 210 at a distal end (e.g., distal to central axis 221), and a shorter, inner height 211 at inner perimeter 208, or a curved outward-facing surface, where a height of the teeth 213 may vary across the length 216 of the teeth 213.

In other embodiments, each tooth 213 may not have a three-dimensional quadrangular shape. For example, each tooth 213 may have a three-dimensional triangular shape, or a three-dimensional circular shape, or a different three-dimensional shape. Additionally, in some embodiments, one or more sides of each tooth 213 may be curved.

The teeth 213 of first face 201 may be distributed circumferentially around first face 201 at equal distances from each other. That is, each tooth 213 of first face 201 may be separated from a first adjacent tooth 213 in a first circumferential direction along inner perimeter 208 by a spacing 218. Each tooth 213 of first face 201 may be separated from the first adjacent tooth 213 in a first circumferential direction along outer perimeter 203 (or along a line at inset depth 209) by a spacing 220. Each tooth 213 of first face 201 may be separated from a second adjacent tooth 213 in a second circumferential direction along inner perimeter 208 by the spacing 218 and along outer perimeter 203 (or along a line at inset depth 209) by the spacing 220. In various embodiments, spacing 218 may be greater than inner width 212 and spacing 220 may be greater than outer width 214. In other embodiments, the teeth 213 of first face 201 may be distributed circumferentially around first face 201 at unequal distances from each other, where a spacing between each tooth 213 may not be the same.

A sizing and a spacing of the set of teeth 213 may depend on an estimated load supported by the teeth 213 in a condition where first face 201 of dual-faced clutch collar 200 is engaged with an opposing face of the first gear, as described above. For example, the shaft may be an output shaft of the transmission, where dual-faced clutch collar 200 may be slidably coupled to the output shaft and the first gear may be rotating around the output shaft. In a first embodiment of dual-faced clutch collar 200, the first gear may be coupled to a first input gear of an input shaft of the transmission (e.g., first input gear 162 of FIG. 1B) at a first gear ratio. The first gear ratio may result in a high amount of torque being delivered to the first gear, whereby an engagement between first face 201 of dual-faced clutch collar 200 and the first gear may be a high-torque coupling. During the high-torque coupling, the set of teeth 213 may mesh with a corresponding set of similarly sized teeth arranged on an opposing face of the first gear (e.g., a face of the first gear opposing first face 201). To support the high amount of torque, the set of teeth 213 may be sized at a first size.

In a second embodiment of dual-faced clutch collar 200, the first gear may be coupled to the first input gear at a second gear ratio, where the second gear ratio may result in a lower amount of torque being delivered to the first gear (e.g., lower than in the first embodiment), whereby an engagement between first face 201 of dual-faced clutch collar 200 and the first gear may be a low-torque coupling. During the low-torque coupling, when the set of teeth 213 meshes with the corresponding set of similarly sized teeth arranged on the opposing face of the first gear, to support the low amount of torque, the set of teeth 213 may be sized at a second size. The second size may be smaller than the first size of the first embodiment, since the amount of torque supported by the first face 201 in the second embodiment is less than the amount of torque supported by the first face 201 in the first embodiment. For example, in the second embodiment, the length 216 of each tooth 213 may be smaller than the length 216 of each tooth 213 of the first embodiment, the inner width 212 and/or the outer width 214 of each tooth 213 may be smaller than the inner width 212 and/or the outer width 214 of each tooth 213 of the first embodiment, and/or the inner height 211 and/or the outer height 210 of each tooth 213 may be less than the inner height 211 and/or the outer height 210 of each tooth 213 of the first embodiment. In other words, each tooth 213 of the second embodiment may be thinner, shorter, or lower than each tooth 213 of the first embodiment.

If the set of teeth 213 are sized at the second size in the first embodiment, the set of teeth 213 may not be sufficiently large to support the load corresponding to the high-torque coupling, would could result in decreased performance of the transmission and a degradation of the set of teeth 213, the first face 201, and/or the first gear. Alternatively, if the set of teeth 213 are sized at the first size in the second embodiment, the set of teeth 213 may be oversized to support the load corresponding to the low-torque coupling, resulting in a waste of material used in dual-faced clutch collar 200 and a corresponding cost.

Additionally, if the set of teeth 213 are oversized, an amount of neutral space between the first gear and the second gear may be reduced, where the neutral space corresponds to a distance along the shaft within which dual-faced clutch collar 200 travels between engaging the first gear and engaging the second gear. When the neutral space is reduced, a performance of the transmission may be reduced. For example, a larger neutral window may allow for a transmission controller (e.g., controller 110) to have more freedom when commanding the clutch to the neutral position. If the neutral window is too small, the clutch may overshoot the neutral position and clash with a respective gear, which may cause vibration or damage. A larger neutral window may protect components of the transmission from damage, and allow to the controller to disengage more rapidly and with less wear and/or damage. Additionally, oversizing the set of teeth 213 may result in slower engagement of the first gear, where if the size of the set of teeth 213 in the second condition were reduced, engagement of the first gear would be faster and smoother. For example, a time of engagement may be reduced by a factor of 3 or 4. Further, a probability of shift abandonment may be reduced, where the shift abandonment may occur when the set of teeth 213 is not able to engage with teeth of an opposing gear within a time window allowed for shifting.

Similarly, in the first embodiment, a first number of teeth 213 may be selected, where the first number of teeth 213 may be a minimum number of teeth 213 sufficient to support the load corresponding to the high-torque coupling. In the second embodiment, a second number of teeth 213 may be selected, where the second number of teeth 213 may be a minimum number of teeth 213 sufficient to support the load corresponding to the low-torque coupling of the second condition. Thus, the second number of teeth 213 may be smaller than the first number of teeth 213. Accordingly, a spacing of the teeth 213 (e.g., inner spacing 218 and outer spacing 220) may be different between the first embodiment and the second embodiment, due to a different number of teeth 213 used in the first embodiment and the second embodiment. For example, in the first embodiment, first face 201 may include a greater number of teeth 213 separated by a first spacing, and in the second condition, first face 201 may include a smaller number of teeth 213 separated by a second spacing, where the second spacing may be greater than the first spacing.

Further, the number of teeth 213, the sizing of the teeth 213, and the spacing of the teeth 213 may be adjusted in various ways to meet a demand for a load on the teeth 213. For example, if a torque on the teeth 213 is estimated to be higher, a number of teeth 213 included on first face 201 may be increased, or a size of the teeth 213 included on first face 201 may be increased, or both the number of the teeth 213 and the size of the teeth 213 may be increased. Alternatively, in some examples, a greater amount of torque may be supported by increasing the number of the teeth 213 while decreasing the size of the teeth 213, or decreasing the number of the teeth 213 while increasing the size of the teeth 213. Thus, the number of teeth 213, the sizing of the teeth 213, and the spacing of the teeth 213 may vary depending on operational requirements of the transmission.

FIG. 2B shows a second perspective view 250 of dual-faced clutch collar 200, where second perspective view 250 shows second face 202 of dual-faced clutch collar 200. Second face 202 of dual-faced clutch collar 200 may extend radially out from inner perimeter 208 to outer perimeter 203 for a radial extent 252. Second face 202 of dual-faced clutch collar 200 may include a set of teeth 251, where each tooth 251 protrudes axially out of second face 202, as described above in reference to the set of teeth 213 of first face 201. Like the set of teeth 213, each tooth 251 may have a three-dimensional quadrangular shape, with a length 254 extending radially out from inner perimeter 208, an inner width 256 at inner perimeter 208, and an outer width 258 proximate to outer perimeter 203. In some embodiments, as described above in reference to FIG. 2A, some or all of teeth 251 may have a length 254 that is less than the radial extent 252 of second face 202, where the teeth 251 do not extend all the way to outer perimeter 203, and the teeth 251 are inset from outer perimeter 203 by an inset depth 253. Each tooth 251 may have a height 260 at which the tooth 251 extends axially out from second face 202. Further, in some embodiments, the teeth 251 may include a beveled outward-facing surface, where the outward-facing surface has an outer height 260 at a distal end (e.g., distal to central axis 221), and a shorter, inner height 262 at inner perimeter 208.

The teeth 251 of second face 202 may be distributed circumferentially around second face 202 at equal distances from each other. That is, each tooth 251 of second face 202 may be separated from a first adjacent tooth 251 in a first circumferential direction along inner perimeter 208 by a spacing 270, and along outer perimeter 203 (or along a line at inset depth 253) by a spacing 272. Each tooth 251 of second face 202 may be separated from a second adjacent tooth 251 in a second circumferential direction along inner perimeter 208 by the spacing 270 and along outer perimeter 203 (or along a line at inset depth 253) by the spacing 272. In various embodiments, spacing 270 may be greater than inner width 256 and spacing 272 may be greater than outer width 258.

A size of teeth 251 of second face 202 of dual-faced clutch collar 200 may be different from the size of teeth 213 of first face 201 of dual-faced clutch collar 200. For example, length 254 of each tooth 251 may be larger or smaller than length 216 of each tooth 213 of first face 201. Inner width 256 of each tooth 251 may be larger or smaller than inner width 212 of each tooth 213 of first face 201. Outer width 258 of each tooth 251 may be larger or smaller than outer width 214 of each tooth 213 of first face 201. Outer height 260 of each tooth 251 may be larger or smaller than outer height 210 of each tooth 213 of first face 201. Inner height 262 of each tooth 251 may be larger or smaller than inner height 211 of each tooth 213 of first face 201. Additionally, a number of teeth 251 of second face 202 may be different from the number of teeth 213 of first face 201. For example, first face 201 may include a first number of teeth 213, and second face 202 may include a second number of teeth 251, where the second number may be larger or smaller than the first number.

In the embodiment depicted in FIG. 2B, the size of each tooth 251 of second face 202 is the same as the size of each tooth 213 of first face 201. However, the number of teeth 251 of second face 202 is smaller than the number of teeth 213 of first face 201. In other embodiments, the size of each tooth 251 of second face 202 may be different from the size of each tooth 213 of first face 201, and the number of teeth 251 of second face 202 may be the same as the number of teeth 213 of first face 201.

As a result of second face 202 having a smaller number of teeth 251 than the number of teeth 213 of first face 201, spacing 270 at inner perimeter 208 of second face 202 may be greater than spacing 218 of first face 201, and spacing 272 at outer perimeter 203 of second face 202 may be greater than spacing 220 of first face 201. Further, in various embodiments, the teeth 251 of second face 202 may align axially with select teeth 213 of first face 201. For example, in some embodiments, the teeth 251 of second face 202 may align axially with every other tooth 213 of first face 201, in an alternating manner. For example, a first tooth 280 of second face 202 is axially aligned with a tooth 281 of first face 201. However, a second tooth 282 of first face 201 is not axially aligned with a tooth of second face 202 (e.g., at a location 283 of second face 202). In other embodiments, the teeth 251 of second face 202 may not be axially aligned with any select teeth 213 of first face 201, or a portion of the teeth 251 of second face 202 may be axially aligned with some teeth 213 of first face 201, but not axially aligned with other teeth 213 of first face 201 (e.g., in a non-alternating manner).

In FIG. 2B, second face 202 includes 9 teeth 251, while first face 201 includes 18 teeth 213. In other words, first face 201 includes twice as many teeth as second face 202. As a result of including twice as many teeth as second face 202, the set of teeth 213 of first face 201 may support a greater amount of torque than the set of teeth 251 of second face 202. As a result of first face 201 including a greater number of teeth than second face 202, first face 201 may support a high-torque coupling with a first gear configured to rotate around the output shaft (e.g., first output gear 132 of FIG. 1B), where the high-torque coupling may be a result of the first gear having a gear ratio that generates a high amount of torque. In the same way, as a result of second face 202 including a smaller number of teeth than first face 201, second face 202 may support a low-torque coupling with a second gear configured to rotate around the output shaft (e.g., second output gear 134 of FIG. 1B), where the low-torque coupling may be a result of the second gear having a gear ratio that generates a lower amount of torque than the first gear. While second face 202 may not have a sufficient number of teeth to support a high-torque coupling with the first gear, an advantage of including the smaller number of teeth on second face 202 is that a time of engaging the second gear may be less than if second face 202 included the same number of teeth as first face 201.

Figure 3:
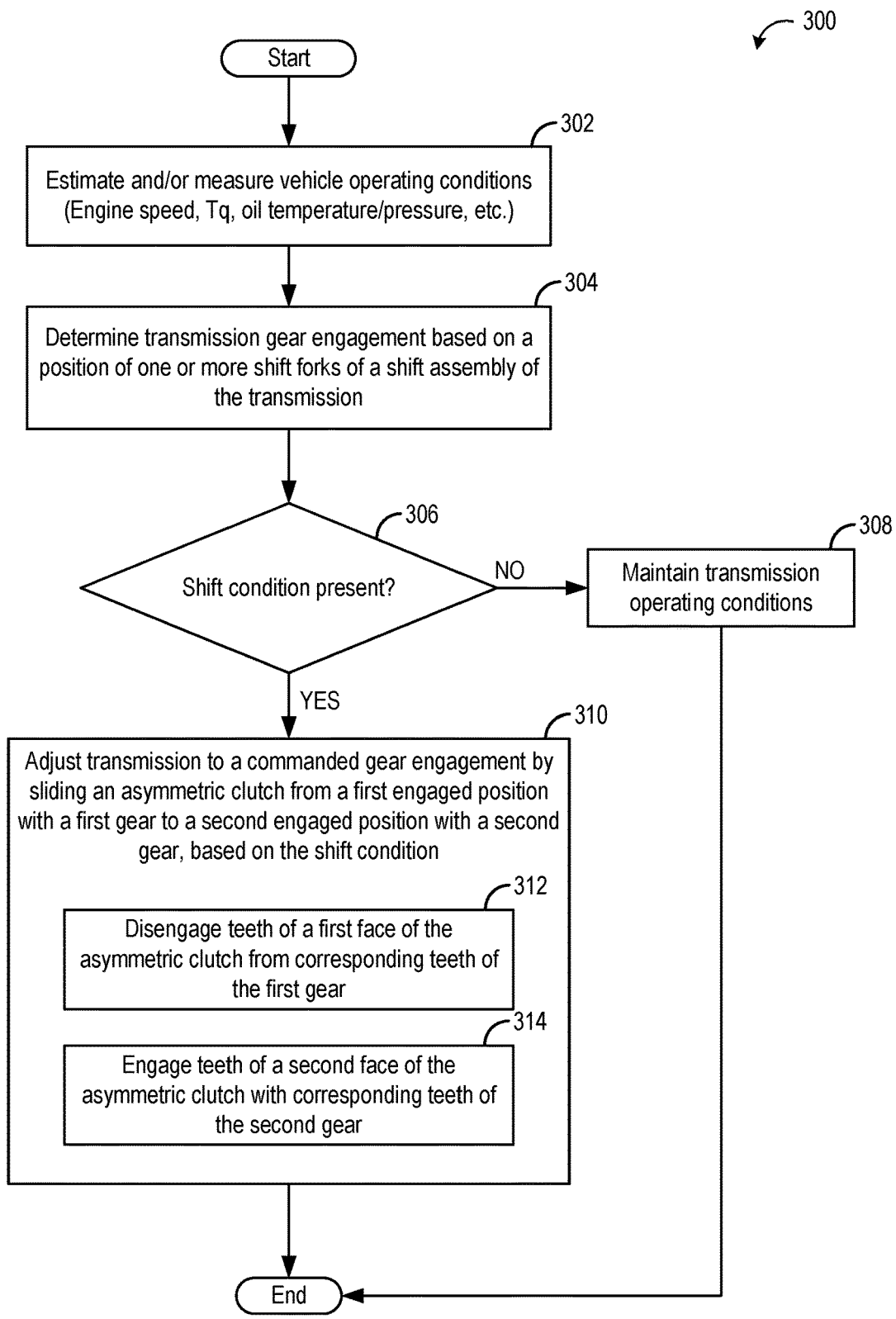
FIG. 3 is a flowchart illustrating an exemplary method for engaging one or more gears with the asymmetric dual-faced clutch collar of FIGS. 2A and 2B.

Referring now to FIG. 3, an exemplary method 300 is shown for engaging one or more gears of a transmission with the asymmetric dual-faced clutch collar of FIGS. 2A and 2B. The systems and components described herein with reference to FIG. 3 may be similar to, or the same as, those discussed above with reference to FIGS. 1A-2B. However, in some examples, method 300 may be implemented by other systems, processors, or components without departing from the scope of this disclosure.

Referring now to FIG. 3, at 302, method 300 includes estimating and/or measuring vehicle operating conditions. Vehicle operating conditions may be estimated based on one or more outputs of various sensors of the vehicle (e.g., such as oil temperature sensors, engine speed or wheel speed sensors, torque sensors, cam position sensors, etc., as described above in reference to vehicle 100 of FIG. 1A). Vehicle operating conditions may include engine speed and load, vehicle speed, position of one or more shift forks of a shift assembly, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc.

At 304, method 300 includes determining transmission gear engagement based on a position of the one or more shift forks of the shift assembly (e.g., shift fork 168 of shift assembly 112). In various embodiments, the position of the one or more shift forks may be determined from feedback from a position sensor. As one example, the controller may determine that the one or more shift forks are in a neutral position (e.g., where the position does not result in engagement of a gear of the transmission). As another example, the controller may determine that a first shift fork of the one or more shift forks is in a neutral position, while a second shift fork of the one or more shift forks is in a non-neutral position (e.g., where the non-neutral position indicates an engagement of a gear of the transmission).

At 306, method 300 includes determining whether a shift condition is present. In some embodiments, the transmission may be a manual transmission, and the shift condition may be present when an operator of the vehicle adjusts an input device of the manual transmission (e.g., an input device 114), such as a shift lever. For example, the operator may manually disengage a clutch of the transmission (e.g., asymmetric clutch 130) from a first gear of the transmission (e.g., first output gear 132) and adjust a position of the shift lever to engage the clutch with a second gear of the transmission (e.g., second output gear 134).

Alternatively, the transmission may be an automatic or automatic manual transmission, where the shift condition may be one of a plurality of different conditions, as determined by the controller, resulting in a commanded adjustment to the current gear engagement of the transmission via the shift assembly. For example, the controller may continuously monitor one or more parameters (e.g., vehicle speed, accelerator pedal position, engine speed, electric motor speed, an estimated and/or a predicted shifting speed, fuel efficiency, tow load, road grade, engine temperature, motor temperature, battery consumption, reduction of component wear and/or degradation, etc.) and may determine that a shift condition is present based on the vehicle operating conditions. As one example, the controller may determine whether a shift condition is present based on accelerator pedal position and vehicle speed. For example, the determination of whether a shift condition is present may be performed by the controller via instructions stored in non-transitory memory of the controller, with the determination being a function of both accelerator pedal position and vehicle speed.

The determination of whether the shift condition is present may be based on input received by the controller from one or more sensors of the vehicle. For example, based on input from one or more position sensors, the controller may determine at 304 that the transmission of the vehicle is operating with a first gear (e.g., first output gear 132) of the transmission engaged. Based on a vehicle speed sensor, the controller may determine that the vehicle speed and/or engine speed is above a pre-determined speed at which transitioning from engagement of the first gear to engagement of a second gear (e.g., second output gear 134) provides increased engine efficiency (e.g., to maintain the engine speed within a pre-determined range, where the pre-determined range includes engine speeds having a relatively high ratio of torque output versus fuel consumption). The controller may also determine from the vehicle speed sensor that the vehicle speed is increasing (e.g., based on engine speed, previous vehicle speeds, change in vehicle elevation, commanded fuel injection rate, etc.). Based on the aforementioned determinations (e.g., that the vehicle is being operated in the first gear, that the vehicle speed is above the threshold value, and that engine speed and/or vehicle speed is increasing), the controller may determine that a shift condition is present, and therefore the transmission of the vehicle may be shifted from operating with the first gear engaged to operating with the second gear engaged. Alternatively, if the controller determines that the vehicle is being operated in the second gear, and the engine speed sensors indicate that the vehicle speed and/or engine speed is decreasing and that the vehicle speed has fallen below a pre-determined speed at which transitioning from the second gear to the first gear provides increased engine efficiency, the controller may determine that a shift condition is present (e.g., that the vehicle may be shifted from the second gear down to the first gear).

The controller may determine whether a shift condition is present based on input from one or more sensors that include engine speed sensors, wheel speed sensors, throttle sensors, pedal position sensors, oil temperature or pressure sensors, and so on. The controller may determine whether the shift condition is present based on one or more algorithms stored in a memory of the controller, where in some examples the algorithms may be updated responsive to changes in vehicle conditions (e.g., degradation of one or more transmission components) and/or operating driving habits via application of one or more of artificial intelligence (AI), machine learning, and/or data analytics. In some examples, the controller may determine whether the shift condition is present based on a pre-determined vehicle operating mode selected by an operator of the vehicle via a user input device (e.g., button, switch, touchscreen, etc.). For example, a first vehicle operating mode may be configured such that the controller determines that the shift condition is present during conditions in which the vehicle speed is outside of a first pre-determined range of vehicle speeds (e.g., 10 MPH to 20 MPH) while operating with the first gear of the transmission engaged. During conditions in which a different, second vehicle operating mode is selected, the controller may determine that the shift condition is present while the vehicle speed is outside of a different, second pre-determined range of engine speeds (e.g., 20 MPH to 30 MPH) while operating with the first gear of the transmission engaged. The first vehicle operating mode may correspond to a fuel economy mode, for example, while the second vehicle operating mode may correspond to a high torque output mode.

If it is determined at 306 that a shift condition is not present, method 300 proceeds to 308, and the transmission operating conditions are maintained. Maintaining the transmission operating conditions may include maintaining the current gear engagement of the transmission and not adjusting the gear engagement. Maintaining the transmission operating conditions may further include continuing to receive data from transmission sensors (e.g., oil temperature sensors, oil pressure sensors, etc.).

If the controller determines at 306 that a shift condition is present, method 300 proceeds to 310. At 310, the controller may adjust the transmission to a commanded gear engagement by adjusting a position of the one or more shift forks based on the shift condition at 306. As described herein, adjusting the transmission to a commanded gear engagement may include transitioning through configurations in which no gears of the transmission are engaged (e.g., neutral configurations). For example, if the vehicle is operating in the first gear when the controller determines that the shift condition is present (e.g., the estimated and/or measured vehicle speed exceeds the threshold vehicle speed as described above), the controller may initiate a transition from operating the transmission with the first gear engaged to operating the transmission with the second gear engaged by adjusting a shift fork of the one or more shift forks to a neutral position (e.g., a position that does not result in engagement of a gear of the transmission) to disengage the first gear, and then adjusting the shift fork from the neutral position to a position in which the second gear is engaged. Although the transition from engagement of the first gear to engagement of the second gear may include briefly operating the transmission in a neutral gear configuration (e.g., a configuration in which no gears of the transmission are engaged, such as while the first gear is disengaged and before the second gear is engaged), the transition may be referred to as shifting from first gear to second gear.

At 312, adjusting the transmission to a commanded gear engagement may include disengaging teeth (e.g., the first set of teeth 173) of a first face of a dual-faced clutch collar (e.g., dual-faced clutch collar 171) of the asymmetric clutch from corresponding teeth on an opposing face of the first gear (e.g., the second set of teeth 175). When the teeth of the first face of the dual-faced clutch collar are disengaged, a first output torque supported by the first face of the dual-faced clutch collar may be released, whereby the first gear may no longer be transferring torque from an input shaft (e.g., transmission input shaft 106) of the transmission to an output shaft (e.g., transmission output shaft 108) of the transmission.

At 314, adjusting the transmission to a commanded gear engagement may include engaging teeth of a second face of the dual-faced clutch collar (e.g., the first set of teeth 183) with corresponding teeth on an opposing face of the second gear (e.g., the second set of teeth 185). When the teeth of the second face of the asymmetric clutch engage the corresponding teeth of the second gear, a second output torque may be generated on the output shaft through the asymmetric clutch. The second output torque may be different from the first output torque released by the first gear, as a result of a different gear ratio of the second gear with respect to the first gear.

As described above, the teeth of the first face of the dual-faced clutch collar and the teeth of the second face of the dual-faced clutch collar may be differently sized, based on a difference between the first output torque and the second output torque. For example, the teeth of the first face of the dual-faced clutch collar may be sized based on the first output torque, and the teeth of the second face of the dual-faced clutch collar may be sized based on the second output torque. In other words, if the second output torque generated by the second gear is greater than the first output torque generated by the first gear, a number of teeth of the second face of the dual-faced clutch collar may be greater than a number of teeth of the first face of the dual-faced clutch collar. Accordingly, the teeth of the first face of the dual-faced clutch collar may be spaced further apart than the teeth of the second face of the dual-faced clutch collar, where a number and spacing of the teeth of the first face of the dual-faced clutch collar may be sufficient to support the first output torque, but not sufficient to support the second output torque. Alternatively, the teeth of the second face of the dual-faced clutch collar may be larger than the teeth of the first face of the dual-faced clutch collar in order to support the greater second output torque.

Thus, as described herein, a transmission may include an asymmetric clutch with a dual-faced clutch collar, where the dual-faced clutch collar includes a first face with a set of teeth having a first profile, and a second face with a set of teeth having a second profile, where the first profile is different from the second profile. For example, the first profile may include a greater or lesser number of teeth than the second profile, and/or teeth of a greater or lesser size than the second profile. A difference between the first profile and the second profile may be based on a difference between an amount of torque supported by the first face when the dual-faced clutch collar is engaged to a first gear, and an amount of torque supported by the second face when the dual-faced clutch collar is engaged to a second gear. By including two different tooth profiles on opposite faces of the dual-faced clutch collar, different amounts of torque may be supported on the opposite faces. By configuring each face of the dual-faced clutch collar to include a number of teeth sufficient to support an amount of torque demanded of the relevant face, an efficiency of the asymmetric clutch may be increased, an amount of material used in constructing the dual-faced clutch collar may be decreased, and a speed of engaging gears of the transmission may be increased.

The technical effect of including an asymmetric dual-faced clutch collar in a transmission, the asymmetric dual-faced clutch collar including a first tooth profile on a first face of the asymmetric dual-faced clutch collar, and a second, different tooth profile on a second face of the asymmetric dual-faced clutch collar, where the first tooth profile is configured to support a first torque and the second tooth profile is configured to support a second torque, is that an efficiency of the transmission may be increased.

The disclosure also provides support for a dual-faced clutch collar positioned on an output shaft of a gearbox, the clutch collar comprising: a clutch collar spline, where the clutch collar spline mates with the output shaft, a first face having a first set of axially protruding teeth to engage a high-torque coupling, the first set of teeth having a first profile, and a second face having a second set of axially protruding teeth to engage a low-torque coupling, the second set of teeth having a second profile, the second profile being different from the first profile. In a first example of the system, the first profile includes a first number of axially protruding teeth, and the second profile includes a second number of axially protruding teeth, the first number different from the second number. In a second example of the system, optionally including the first example, the first number of axially protruding teeth is greater than the second number of axially protruding teeth. In a third example of the system, optionally including one or both of the first and second examples, a spacing of the axially protruding teeth of the first profile is smaller than a spacing of axially protruding teeth of the second profile. In a fourth example of the system, optionally including one or more or each of the first through third examples, each axially protruding tooth of the second profile is axially aligned with an axially protruding tooth of the first profile. In a fifth example of the system, optionally including one or more or each of the first through fourth examples, each tooth of the first profile has a three-dimensional quadrangular shape with an inner width proximate an inner perimeter of the clutch collar, and an outer width proximate an outer perimeter of the clutch collar, where the outer width is greater than the inner width. In a sixth example of the system, optionally including one or more or each of the first through fifth examples, each tooth of the second profile has a three-dimensional quadrangular shape with an inner width proximate an inner perimeter of the clutch collar, and an outer width proximate an outer perimeter of the clutch collar, where the outer width is greater than the inner width. In a seventh example of the system, optionally including one or more or each of the first through sixth examples, the inner width of each tooth of the first profile is the same as the inner width of each tooth of the second profile, and the outer width of each tooth of the first profile is the same as the outer width of each tooth of the second profile. In an eighth example of the system, optionally including one or more or each of the first through seventh examples, the inner width of each tooth of the first profile is different from the inner width of each tooth of the second profile, and the outer width of each tooth of the first profile is different from the outer width of each tooth of the second profile. In a ninth example of the system, optionally including one or more or each of the first through eighth examples, a first outward-facing surface of each tooth of the first profile is beveled, such that an outer height of the first outward-facing surface proximate the outer perimeter of the clutch collar is greater than an inner height of the first outward-facing surface proximate the inner perimeter of the clutch collar. In a tenth example of the system, optionally including one or more or each of the first through ninth examples, a second outward-facing surface of each tooth of the second profile is beveled, such that an outer height of the second outward-facing surface proximate the outer perimeter of the clutch collar is greater than an inner height of the second outward-facing surface proximate the inner perimeter of the clutch collar, the second outward-facing surface having at least one of: an outer height different from the outer height of the first outward-facing surface, and an inner height different from the inner height of the first outward-facing surface. In a eleventh example of the system, optionally including one or more or each of the first through tenth examples, each tooth of the first profile has a length that is less than a radial extent of the first face, such that the tooth does not extend all the way to the outer perimeter of the clutch collar, and an outer edge of the tooth is inset from the outer perimeter by a first inset depth. In a twelfth example of the system, optionally including one or more or each of the first through eleventh examples, each tooth of the second profile has a length that is less than a radial extent of the second face, such that the tooth does not extend all the way to the outer perimeter of the clutch collar, and an outer edge of the tooth is inset from the outer perimeter by a second inset depth, the second inset depth different from the first inset depth. In a thirteenth example of the system, optionally including one or more or each of the first through twelfth examples, the first profile is configured to support a first amount of torque of the high-torque coupling, and the second profile is configured to support a second amount of torque of the low-torque coupling, where the second amount of torque is different from the first amount of torque.

The disclosure also provides support for a method for a dual-faced clutch collar, comprising: disengaging the dual-faced clutch collar from a first gear, the dual-faced clutch collar slidably coupled to an output shaft of a transmission, the first gear rotatably coupled to the dual-faced clutch collar, and engaging the dual-faced clutch collar with a second gear, the second gear rotating around the output shaft, wherein disengaging the dual-faced clutch collar from the first gear further comprises disengaging a first set of teeth of a first face of the dual-faced clutch collar from a first set of similarly sized teeth of the first gear, the first set of teeth and the first similarly sized teeth having a first profile, and engaging the dual-faced clutch collar with the second gear further comprises engaging a second set of teeth of a second face of the dual-faced clutch collar with a second set of similarly sized teeth of the second gear, the second set of teeth and the second set of similarly sized teeth having a second profile, the first profile different from the second profile. In a first example of the method, the first profile of teeth of the first face is configured to support a first amount of torque when engaged with the first set of similarly sized teeth, and the second profile of teeth of the second face is configured to support a second amount of torque when engaged with the second set of similarly sized teeth, the second amount of torque greater than the first amount of torque. In a second example of the method, optionally including the first example, the first profile includes a first number of teeth, and the second profile includes a second number of teeth, the first number different from the second number. In a third example of the method, optionally including one or both of the first and second examples, the second number of teeth is greater than the first number of teeth, and each tooth of the first number of teeth of the first face is axially aligned with a tooth of the second, greater number of teeth of the second face.

The disclosure also provides support for a system, comprising: a first gear coupleable to a first side of a clutch collar of a clutch, and a second gear coupleable to a second, opposite side of the clutch collar, wherein a plurality of first teeth of the first side is greater than a plurality of second teeth of the second side. In a first example of the system, the plurality of first teeth of the first side have a first shape, and the plurality of second teeth of the second side have a second shape, the second shape different from the first shape.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

FIGS. 1B, 2A, and 2B show example configurations with relative positioning of various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A dual-faced clutch collar positioned on an output shaft of a gearbox, the clutch collar comprising:
    a clutch collar spline, where the clutch collar spline mates with the output shaft;
    a first face having a first set of axially protruding teeth to engage a high-torque coupling, the first set of teeth having a first profile; and
    a second face having a second set of axially protruding teeth to engage a low-torque coupling; the second set of teeth having a second profile; the second profile being different from the first profile.

2. The clutch collar of claim 1, wherein the first profile includes a first number of axially protruding teeth, and the second profile includes a second number of axially protruding teeth, the first number different from the second number.

3. The clutch collar of claim 2, wherein the first number of axially protruding teeth is greater than the second number of axially protruding teeth.

4. The clutch collar of claim 2, wherein a spacing of the axially protruding teeth of the first profile is smaller than a spacing of axially protruding teeth of the second profile.

5. The clutch collar of claim 4, wherein each axially protruding tooth of the second profile is axially aligned with an axially protruding tooth of the first profile.

6. The clutch collar of claim 1, wherein each tooth of the first profile has a three-dimensional quadrangular shape with an inner width proximate an inner perimeter of the clutch collar, and an outer width proximate an outer perimeter of the clutch collar, where the outer width is greater than the inner width.

7. The clutch collar of claim 6, wherein each tooth of the second profile has a three-dimensional quadrangular shape with an inner width proximate an inner perimeter of the clutch collar, and an outer width proximate an outer perimeter of the clutch collar, where the outer width is greater than the inner width.

8. The clutch collar of claim 7, wherein the inner width of each tooth of the first profile is the same as the inner width of each tooth of the second profile, and the outer width of each tooth of the first profile is the same as the outer width of each tooth of the second profile.

9. The clutch collar of claim 7, wherein the inner width of each tooth of the first profile is different from the inner width of each tooth of the second profile, and the outer width of each tooth of the first profile is different from the outer width of each tooth of the second profile.

10. The clutch collar of claim 7, wherein a first outward-facing surface of each tooth of the first profile is beveled, such that an outer height of the first outward-facing surface proximate the outer perimeter of the clutch collar is greater than an inner height of the first outward-facing surface proximate the inner perimeter of the clutch collar.

11. The clutch collar of claim 10, wherein a second outward-facing surface of each tooth of the second profile is beveled, such that an outer height of the second outward-facing surface proximate the outer perimeter of the clutch collar is greater than an inner height of the second outward-facing surface proximate the inner perimeter of the clutch collar; the second outward-facing surface having at least one of:
   an outer height different from the outer height of the first outward-facing surface; and
   an inner height different from the inner height of the first outward-facing surface.

12. The clutch collar of claim 7, wherein each tooth of the first profile has a length that is less than a radial extent of the first face, such that the tooth does not extend all the way to the outer perimeter of the clutch collar, and an outer edge of the tooth is inset from the outer perimeter by a first inset depth.

13. The clutch collar of claim 12, wherein each tooth of the second profile has a length that is less than a radial extent of the second face, such that the tooth does not extend all the way to the outer perimeter of the clutch collar, and an outer edge of the tooth is inset from the outer perimeter by a second inset depth, the second inset depth different from the first inset depth.

14. The clutch collar of claim 1, wherein the first profile is configured to support a first amount of torque of the high-torque coupling, and the second profile is configured to support a second amount of torque of the low-torque coupling, where the second amount of torque is different from the first amount of torque.

\* \* \* \* \*